United States
Sanford

[11] 3,831,436
[45] Aug. 27, 1974

[54] MULTI-PURPOSE REAL-TIME HOLOGRAPHIC POLARISCOPE

[76] Inventor: Robert J. Sanford, 101 Julian Ct., Greenbelt, Md. 20770

[22] Filed: Feb. 23, 1973

[21] Appl. No.: 335,389

[52] U.S. Cl............... 73/88 A, 73/71.3, 350/3.5, 356/33
[51] Int. Cl. .......................................... G01b 11/16
[58] Field of Search............... 73/88 R, 88 A, 71.3; 356/33; 350/3.5

[56] References Cited
UNITED STATES PATENTS

| | | | |
|---|---|---|---|
| 3,178,934 | 4/1965 | O'Regan | 73/88 A |
| 3,563,652 | 2/1971 | Powell et al. | 73/88 A |
| 3,587,301 | 6/1971 | Chau | 73/88 A |

OTHER PUBLICATIONS

M. E. Fourney, Application of Holography to Photoelasticity, Experimental Mechanics, January 1968, p. 33–37.

A. E. Arave et al., NDT Holographic Techniques to Determine the Swage Joint Toughness of the ATR Fuel Elements Materials Evaluation, November 1971, p. 259–264.

*Primary Examiner*—Richard C. Queisser
*Assistant Examiner*—John P. Beauchamp
*Attorney, Agent, or Firm*—R. S. Sciascia; Arthur L. Branning

[57] ABSTRACT

A modification of a real-time holographic interferometer to permit the observation of a complete set of interference patterns from a single reference hologram. The apparatus consists of a conventional off-axis transmission holographic set-up with the addition of several polarization optical elements to alter the polarization of the light at various stages of a procedure to study an object. These elements are adjusted so as to produce circularly polarized light for recording the reference hologram. After producing the hologram these elements are readjusted to any desired state of polarization and the corresponding interference pattern is observed in real-time and may be changed at any time to view a different type of interference pattern.

7 Claims, 1 Drawing Figure

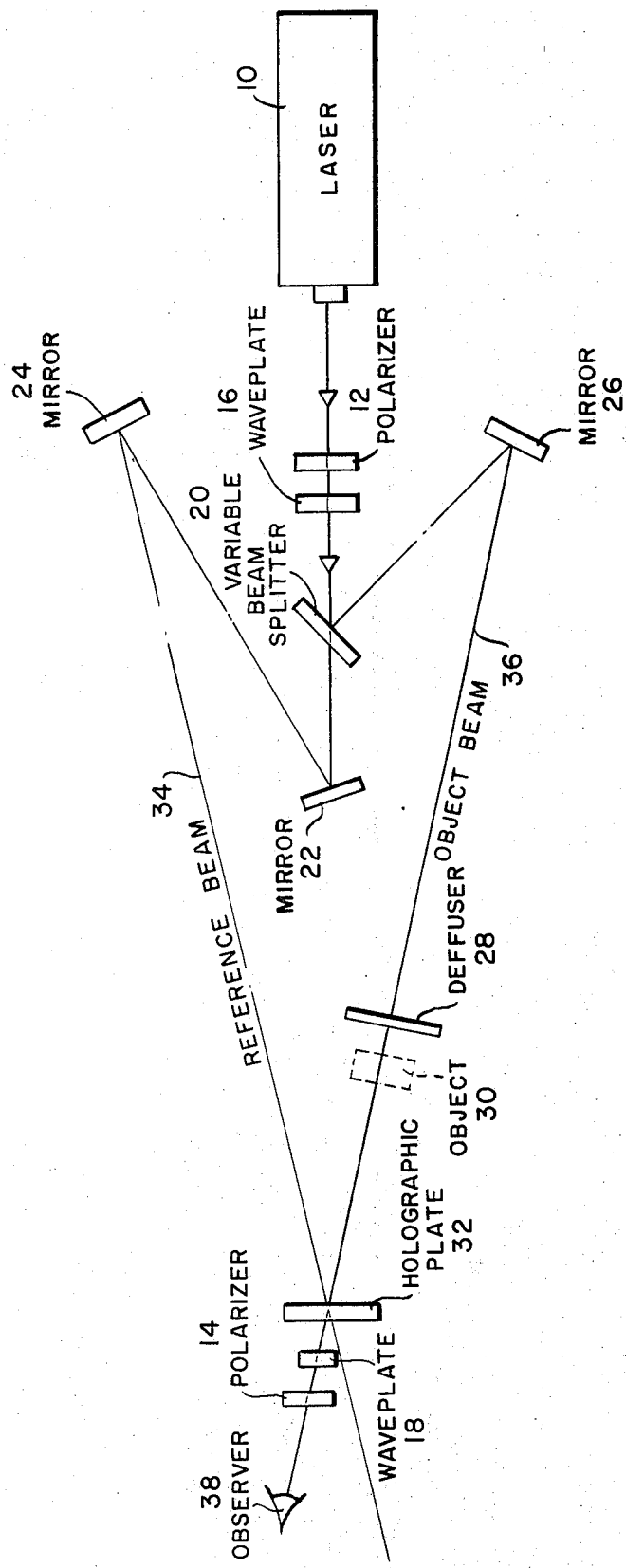

MULTI-PURPOSE REAL-TIME HOLOGRAPHIC POLARISCOPE

BACKGROUND OF THE INVENTION

This invention relates generally to interferometry and more specifically to the measurement of the physical characteristics including the principal indices of refraction, $\eta_1$ and $\eta_2$, of birefringent materials in real time. Prior devices such as the polariscope have measured relative retardation, i.e., the difference between the principal indices of refraction, $\eta_1 - \eta_2$, individually or other physical characteristics. For this purpose, an interferometer is required. Two basic methods of interferometry have been shown useful for birefringence measurements. The first method known as the double exposure method, requires production of a first hologram of the object being studied in a reference state. A second hologram is then produced by the same optical system with a change introduced into the object. Upon reconstruction, an interference pattern is formed due to the interference of two reconstructed wavefronts from each of the holograms. If plane polarized light is used to record the hologram the interference pattern is proportional to the absolute retardation of the object. To determine principal indices of refraction, and thus fully analyze the object, the procedure must be repeated a successive number of times with light which is plane polarized in different directions. An apparent limitation of this method is the delay involved in carrying out the procedure repeatedly since only one type of interference pattern can be obtained. Alternatively, if circularly polarized light is used to record the hologram, the interference pattern would contain information related to the sum and difference of the principal indices of refraction simultaneously. In either case only one change in birefringence can be made for each set of holograms recorded.

These limitations led to the development of the real time method, which differs from the double exposure method in that only one hologram of the object is recorded. In the real time method a hologram is made of the object in a reference state. The hologram thus produced is reilluminated by the reference beam. The wavefront of the holographic image is then allowed to interfere with the wavefront of the object beam to produce the absolute retardation interference patterns. Changes can subsequently be induced in the object and the resultant changes in birefringence can be viewed in real time. This method however, only allows the observer to view one type of pattern corresponding to the particular polarization of the light used for illumination. To view different patterns and measure each of the principal indices of refraction, thereby completely analyzing the object, it is necessary to obtain the required number of independent interference patterns.

SUMMARY OF THE INVENTION

The present invention overcomes the disadvantages of the prior art by using a conventional off-axis real time holographic interferometer wherein circularly polarized light is used to record the reference hologram in all cases rather than differently polarized light as used previously. The characteristics of such a reference hologram are that it contains information related to every possible state of polarization. This permits any particular state of polarization to be investigated by merely changing the polarization in the interferometer while observing the interference patterns. Additionally, the present device allows observation of the relative retardation patterns $\eta_1 - \eta_2$ by simply using it as a conventional polariscope. Thus the physical characteristics of the birefringent material can be thoroughly analyzed in real time with a single hologram.

OBJECTS OF THE INVENTION

It is therefore the object of the invention to measure the absolute retardation, relative retardation, principal directions and combinations of the above in birefringent materials in real time through the use of a single hologram.

Other objects, advantages, and novel features of the invention will become apparent from the following detailed description of the invention when considered in conjunction with the accompanying drawing wherein:

BRIEF DESCRIPTION OF THE DRAWING

The FIGURE shows an apparatus for carrying out the preferred embodiment of the invention.

DETAILED DESCRIPTION

The FIGURE is a schematic diagram of a modified version of an off-axis real time interferometer of the Leith and Upatnieks type for carrying out the present invention. The modifications consist of the introduction of polarizers 12 and 14 and waveplates 16 and 18 at the input and output of the system. These elements are introduced in the system at different stages of an object study to affect changes in the incoming and outgoing light. Their precise effect will be more clearly described below.

The process of the present invention is carried out in two stages. In the first stage a holographic plate 32 records the diffraction patterns characteristic of the wavefronts of a reference beam 34 and an object beam 36. These beams are produced by a variable beam splitter 20 which controls the proportional intensity of the beams. Each beam through the use of off-axis optics, travels at approximately equal distance from the variable beam splitter 20 to the holographic plate 32. The object beam 36 is transmitted through the birefringent object 30 while the object is at a reference state. Quarter waveplate 16 produces light which is circularly polarized from incident plane polarized light produced by polarizer 12. This is accomplished by orienting the quarter waveplate 16 such that its principal axis is at 45° with respect to the axis of the polarizer 12. Polarizer 12 of course would be unnecessary if the light produced by laser 10 were plane polarized. In any event, a reference state hologram is recorded with circularly polarized light from the interference of the wavefronts of the reference beam 34 and the object beam 36.

After the hologram 32 is produced it is placed in its original position if moved in the modified interferometer of the FIGURE. The variable beam splitter 20 is then adjusted so that the intensity of the reconstructed image produced by the illumination of the hologram 32 with the reference beam 34 is the same as the intensity of the object beam 36 passing through the object under load conditions. The result is an interference pattern known as the absolute retardation which is produced by the interference of the wavefront of the reconstructed image with the wavefront of the object beam 36 with the object under load conditions. Waveplate 18 and polarizer 14 select the relative retardation patterns, i.e., the patterns of the object viewed through the waveplate 18 and polarizer 14, which modulate the absolute retardation interference patterns so that a variety of physical characteristics of the object can be observed.

Examples of typical polarization states of the waveplates 16 and 18 and polarizers 12 and 14 for patterns desired are catalogued in the tables below for both unpolarized laser light (Table 1) and polarized laser light (Table 2).

TABLE 1

UNPOLARIZED LIGHT (Wavelength = $\lambda$)
Polarization Optical Elements (Typical)

| Holographic Operation | Desired Pattern | Polarizer 12 | Waveplate 16 | Waveplate 18 | Polarizer 14 | Notes |
|---|---|---|---|---|---|---|
| Hologram Formation | Reference State Hologram | 90° | $\lambda/4$ at 45° | not used | not used | |
| Reconstruction and Real-time interference pattern formation | isopachics ($\eta_1 + \eta_2$) and isochromatics ($\eta_1 - \eta_2$) | 90° | $\lambda/4$ at 45° | Remove | Remove | |
| | isopachics ($\eta_1 + \eta_2$) and enhanced isochromatics ($\eta_1 - \eta_2$) | 90° | $\lambda/4$ at 45° | $\lambda/4$ at 45° | 90° | |
| | Absolute retardation fringes, $\eta_1$ | Parallel to $\eta_1$ direction | Remove | Remove | Remove | |
| | Absolute retardation fringes, $\eta_2$ | Parallel to $\eta_2$ direction | Remove | Remove | Remove | |
| | isoclinics, $\theta$* | $\theta$ | Remove | Remove | $90° + \theta$ | Obstruct Reference beam |
| | Light field isochromatics ($\eta_1 - \eta_2$) half orders | 90° | $\lambda/4$ at 45° | $\lambda/4$ at $-45°$ | 90° | Obstruct Reference beam |
| | Dark field isochromatics ($\eta_1 - \eta_2$) whole orders | 90° | $\lambda/4$ at 45° | $\lambda/4$ at $-45°$ | 0° | Obstruct Reference beam |

* $\theta$ is the angle between the direction of the principal index of refraction and an arbitrary reference direction.

TABLE 2

POLARIZED LIGHT* (Wavelength = $\lambda$)
Polarization Optical Elements (Typical)

| Holographic Operation | Desired Pattern | Polarizer 12 | Waveplate 16 | Waveplate 18 | Polarizer 14 | Notes |
|---|---|---|---|---|---|---|
| Holographic Formation | Reference State Hologram | Remove | $\lambda/4$ at 45° | not used | not used | |
| Reconstruction and real-time interference pattern formation | isopachics and isochromatics | Remove | $\lambda/4$ at 45° | Remove | Remove | |
| | isopachics and enhanced isochromatics | Remove | $\lambda/4$ at 45° | $\lambda/4$ at 45° | 90° | |
| | Absolute retardation fringes, $\eta_1$ | Remove | $\lambda/2$ at $\alpha/2$ | Remove | Remove | Waveplace 16 used as half-wave plate to rotate polarization parallel to $\eta_1$ direction ($\alpha$) |
| | Absolute retardation fringes, $\eta_2$ | Remove | $\lambda/2$ at 90° $+ \alpha/2$ | Remove | Remove | Waveplate 16 used as half-wave plate to rotate polarization parallel to $_2$ direction (90° $+ \alpha$) |
| | isoclinics, $\theta$ | Remove | $\lambda/2$ at $\theta/2$ | Remove | $90 + \theta$ | Obstruct reference beam |
| | Light field isochromatics | Remove | $\lambda/4$ at 45° | $\lambda/4$ at $-45°$ | 90° | Obstruct reference beam |
| | Dark field isochromatics | Remove | $\lambda/4$ at 45° | $\lambda/4$ at $-45°$ | 0° | Obstruct reference beam |

* Vertical polarization assumed.

Thus the clear advantage of the present invention over prior systems is that only one reference hologram of an object is required in order to obtain an entire set of interference patterns for the object under a chosen birefringence state. Through the use of this invention it is not possible to determine the complete state of birefringence of an object in a single procedure.

The optical path arrangement shown in FIG. 1 is typical for the production of off-axis holograms; however, numerous other arrangements have been utilized and will work equally well with the present invention.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. A method of investigating the characteristics of a birefringent object through the use of a modified real time holographic interferometer comprising the steps of:
    illuminating an object at a reference state with circularly polarized light in said modified interferometer such that a hologram is recorded;
    inducing a change in the physical state of said object;
    reilluminating said recorded hologram in said modified interferometer with plane polarized light;
    rotating the plane of polarization of said reilluminating light so that different characteristics of said birefringent object can be observed.

2. The method of claim 1 wherein the plane of polarization of said reilluminating light is rotated to be parallel to one of the principal indices of refraction.

3. In an off-axis real time holographic interferometer having a beam splitter for splitting an input light source into a reference and an object beam wherein said reference beam and said object beam interfere to form a diffraction pattern at a holographic plate, the improvement comprising:
    a first polarizer disposed between said beam splitter and said light source;
    a first waveplate disposed between said beam splitter and said first polarizer;
    a second polarizer disposed between said holographic plate and, an observer;
    a second waveplate disposed between said second polarizer and said holographic plate.

4. In an off-axis real time holographic interferometer having a beam splitter for splitting a plane polarized input light source into a reference and an object beam wherein said reference beam and said object beam interfere to form a diffraction pattern at a holographic plate, the improvement comprising:
    a first waveplate disposed between said beam splitter and said light source;
    a polarizer disposed between said holographic plate and, an observer;
    a second waveplate disposed between said polarizer and said holographic plate.

5. The method of claim 1, further including the step of:
    obstructing the reference beam of said interferometer.

6. The combination of claim 3, further including: means to obstruct said reference beam.

7. The combination of claim 4, further including: means to obstruct said reference beam.

* * * * *